US011979009B2

(12) United States Patent
Cardin et al.

(10) Patent No.: US 11,979,009 B2
(45) Date of Patent: May 7, 2024

(54) CABLE TRAY SUPPORT APPARATUS AND SYSTEM

(71) Applicant: ABB Schweiz AG, Baden (CH)

(72) Inventors: Daniel Cardin, Sainte-Julie (CA); Daniel Lalancette, Saint-Jean-sur-Richelieu (CA)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 17/681,408

(22) Filed: Feb. 25, 2022

(65) Prior Publication Data

US 2023/0275409 A1 Aug. 31, 2023

(51) Int. Cl.
*H02G 3/04* (2006.01)
*F16L 3/26* (2006.01)

(52) U.S. Cl.
CPC .............. *H02G 3/0456* (2013.01); *F16L 3/26* (2013.01)

(58) Field of Classification Search
CPC .......... F16L 3/26; H02G 3/263; H02G 3/0456
See application file for complete search history.

(56) References Cited

U.S. PATENT DOCUMENTS

| | | | | |
|---|---|---|---|---|
| 3,791,613 A * | 2/1974 | Nollen | .................. | H02G 3/0456 248/68.1 |
| 3,915,420 A * | 10/1975 | Norris | .................. | H02G 3/0456 248/68.1 |
| 4,080,742 A * | 3/1978 | Osterried | .................. | F16J 3/04 D10/64 |
| 5,465,929 A * | 11/1995 | Dooley | .................. | H02G 3/0456 403/294 |
| 5,580,014 A * | 12/1996 | Rinderer | .............. | H02G 3/0456 248/49 |
| 6,313,405 B1 * | 11/2001 | Rinderer | .............. | H02G 3/0456 174/99 R |
| 6,431,501 B1 * | 8/2002 | Molek | .................. | H02G 3/0456 248/68.1 |
| 7,922,012 B2 * | 4/2011 | Sisley | .................. | H02G 3/0406 248/74.1 |
| 8,459,604 B2 * | 6/2013 | Smith | .................. | H02G 3/0608 248/57 |
| 8,899,544 B2 | 12/2014 | Meredith | | |
| 8,978,223 B1 | 3/2015 | Archer et al. | | |

(Continued)

FOREIGN PATENT DOCUMENTS

| | | | | |
|---|---|---|---|---|
| EP | 373021 A | * 6/1990 | ............ | F16B 7/0446 |
| ES | 1126630 U | * 10/2014 | ............ | F16B 7/0473 |

(Continued)

*Primary Examiner* — Eret C McNichols
(74) *Attorney, Agent, or Firm* — Armstrong Teasdale LLP

(57) ABSTRACT

Provided herein is a cable tray apparatus including a first side rail, a second side rail spaced from the first side rail, and at least one support member having a first end and a second end. The second side rail includes a support wall and first and second tabs extending from the support wall. The support member includes side walls extending between the ends, and first and second recesses formed within each of the two side walls at each end. The support member is located between the side rails, and the tabs of the side rails are configured to engage and be located within the respective first and second recesses at the respective ends of the support member. The support member is slidable relative to the side rails along the tabs.

19 Claims, 13 Drawing Sheets

(56) References Cited

U.S. PATENT DOCUMENTS

| | | | |
|---|---|---|---|
| 9,350,147 B2 * | 5/2016 | Tally | H02G 3/0608 |
| 9,866,000 B2 * | 1/2018 | Mostazo Oviedo | F16B 7/0473 |
| 10,309,554 B2 * | 6/2019 | Shelton | H02G 3/263 |
| 10,367,340 B2 * | 7/2019 | Bae | H02G 3/0412 |
| 10,451,198 B2 * | 10/2019 | Lupsa | F16B 2/065 |
| 10,619,791 B2 | 4/2020 | Zhang et al. | |
| 11,437,793 B2 * | 9/2022 | Johnson | F16L 3/26 |
| 11,605,938 B2 * | 3/2023 | Cardin | H02G 3/0608 |
| 2012/0235010 A1 * | 9/2012 | Meredith, Jr. | H02G 3/263 |
| | | | 248/500 |
| 2016/0006227 A1 * | 1/2016 | Tally | H02G 3/0608 |
| | | | 403/188 |
| 2016/0018026 A1 * | 1/2016 | Shelton | F16M 13/022 |
| | | | 248/65 |
| 2017/0223863 A1 | 8/2017 | Jost et al. | |
| 2019/0353285 A1 | 11/2019 | Shelton | |
| 2021/0138611 A1 | 5/2021 | Brooks et al. | |
| 2021/0231146 A1 | 7/2021 | Shelton | |
| 2021/0242671 A1 | 8/2021 | Keskar et al. | |
| 2022/0060007 A1 | 2/2022 | Khairnar et al. | |

FOREIGN PATENT DOCUMENTS

| | | | | |
|---|---|---|---|---|
| ES | 1200090 U | * | 11/2017 | H02G 3/0456 |
| ES | 1220465 U | * | 11/2018 | B21D 39/044 |
| KR | 101414792 B1 | * | 7/2014 | |
| KR | 2013637 B1 | * | 8/2019 | F16B 1/0014 |
| WO | WO-2013133495 A1 | * | 9/2013 | H02G 3/0456 |

\* cited by examiner

CABLE TRAY SUPPORT APPARATUS AND SYSTEM

BACKGROUND

The field of the disclosure generally relates to cable management systems, and more particularly, to a cable tray system with snap-in support members.

Cable management systems are utilized in electrical distribution installations to route electrical cables between upstream components, such as electrical mains and switchgears, and downstream components, such as switchboards, panelboards, transformers, and transfer switches. Multiple cables of varying thickness are conventionally placed in a trough or a cable tray that in turn is suspended from a floor joist or ceiling structural support member. The cable tray systems are frequently installed in large factories, warehouses and office buildings for example. When installed, the cable trays extend long distances and support a considerable collective cable weight. Each cable routed from an upstream component can be substantial in weight and size. For example, a single 600 KCMIL copper conduit rated for 350 amperes weighs 1,950 pounds per 1,000 feet and has a diameter of 0.775 inches. Thus, the cable trays system must have sufficient structural integrity to support the considerable weight of the cable load.

Cable trays are frequently modular, comprised of a series of premanufactured support members, or rungs, that are connected to side rails to form subassemblies when manufactured. When installed for use, the subassemblies, or sections of the cable trays, are joined to form a continuous cable tray system of the length required for a specific installation site. The joined subassemblies are supported by the side rails that are in turn anchored to the joist or other structural member. The support members of conventional cable tray systems rigidly connect to side rails by aligning pre-punched holes formed on the support member and the side rails and joining the pieces together with threaded fasteners or rivets. Other cable tray systems utilize additional hardware such as splice plates, clamps, brackets, or screws to join support members to side rails, which require additional fastener or riveted connections. Both fasteners and rivets require proper pre-punched hole alignment, as well as proper technique to secure the fasteners or rivets. Furthermore, fasteners are subject to mechanical failure by way of fastener shearing due to the substantial weight the cable tray system, cross-threading of fasteners, or improper torqueing of fasteners. Cable tray systems may alternatively utilize welds to join support members to side rails. While welding does not generally use alignment of features of the system, welding requires a skilled technician to be on-site or at the manufacturing plant, specialized equipment, and considerable added installation or manufacturing time. Once conventional cable tray systems are assembled, they are difficult to disassemble. If welds need to be broken, the integrity of the cable tray assembly may be compromised. Also, if it is determined that a greater number of support members between side rails is required to suitably support the cable load, it is difficult to insert additional support members between the rails or otherwise reposition existing support members because the location of the existing support members is fixed and cannot be adjusted.

Thus, there is a need in the art to provide a cable tray system that eliminates the need for conventional fastening and assembly methods to reduce fabrication times and also provides installation flexibility so that support member positions can be easily adjusted and removed if needed.

BRIEF DESCRIPTION

In one aspect, a cable tray apparatus including a first side rail, a second side rail spaced from the first side rail, and at least one support member having a first end and a second end is provided. Each side rail includes a support wall and first and second tabs extending from the support wall. The support member includes side walls extending between the ends, and first and second recesses formed within each of the two side walls at each end. The support member is located between the first side rail and the second side rail, and the first and second tabs of the first side rail are configured to engage and be located within the respective first and second recesses at the first end of the support member. The first and second tabs of the second side rail are configured to engage and be located within the respective first and second recesses at the second end of the support member, and the support member is slidable relative to the first and second side rails along the first and second tabs.

In another aspect, a cable tray system including a first side rail, a second side rail spaced from the first side rail, and a plurality of support members having a first end and a second end is provided. Each side rail includes a support wall and first and second tabs extending from the support wall. The plurality of support members include side walls extending between the ends, and first and second recesses formed within each of the two side walls at each end. The plurality of support members are located at different positions between the first side rail and the second side rail. The first and second tabs of the first side rail are configured to engage and be located within the respective first and second recesses at the first end of the support members, and the first and second tabs of the second side rail are configured to engage and be located within the respective first and second recesses at the second end of the support members. The plurality of support members are slidable relative to the first and second side rails along the first and second tabs.

In yet another aspect, a method for assembling a cable tray apparatus is provided. The method includes aligning, at a first end and a second end of one or more support members, first and second recesses of the one or more support members with respective first and second tabs of a first side rail and a second side rail, and sliding the one or more support members into a location along the first and second side rails. The first and second tabs of the first side rail are configured to engage and be located within the respective first and second recesses at the first end of the support member, and the first and second tabs of the second side rail are configured to engage and be located within the respective first and second recesses at the second end of the support member.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1A:
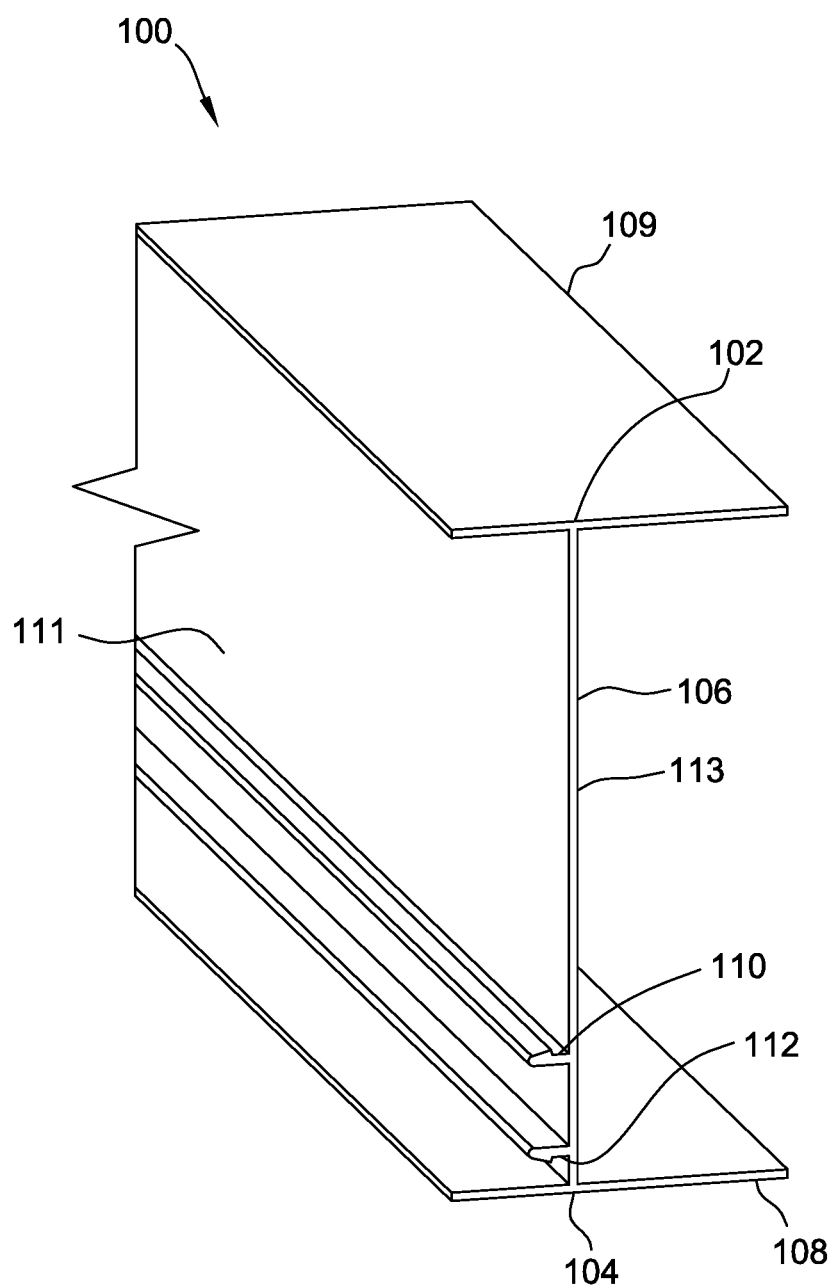
FIG. 1A depicts a perspective view of a portion of a first side rail in an exemplary embodiment.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Described herein is a cable tray system that supports cables, wires and the like that are typically suspended above a ceiling in an office building or industrial facility. The cable tray system of the present embodiment comprises paired side rail members and at least one support member supported by the paired side rails at the support member ends. Each side rail includes first and second tabs, and the support member includes first and second openings at each support member end. The first and second openings are adapted to receive the respective first and second tabs of the adjacent side rail when the support member is located between the side rails.

As further described herein, the first and second tabs of the side rail are sized and shaped to securely fit into the respective first and second openings of the support member such that support member is supported by the tabs of the side rail. That is, the support member of the cable tray system described herein is supported by the tabs of the side rail without requiring additional complicated means for securing the support members to the side rails such as welds, fasteners or adhesive, for example. Further, as will be described further herein, the tab members associated with each side rail are elongate and extend along the length of the associated rails with a substantially consistent cross-sectional shape along the length of the side rail.

The elongate tabs enable the support members to be slid along the elongate tab member length and easily located in the desired relative side rail location necessary to support the associated plurality of cables or wires. As a result, the support members can be easily located or positioned at a location along the rail members and moved to a new location if necessary, and without the need to break welds, loosen a plurality of fasteners, or separate adhered members as with conventional cable tray systems. Accordingly, unlike the prior art systems in which support members are rigidly fixed at a specific locations along a support member, the cable tray system described herein provides support members that can be adjustably located along the side rails in a variety of different configurations, and separated by distances required to suitably support the weight of associated cables.

As described in further detail below, especially with respect to FIG. 6A, the cable tray system (e.g., cable tray system 600, shown in FIG. 6A) includes a pair of side rails. The side rails, examples of which are shown in FIGS. 1A, 1B, 4A, and 4B, include the same structure in each cable tray system. However, in use, ledges and tabs of the side rails are oriented in opposite directions to support opposite ends of each of the at least one support member, examples of which are shown in FIGS. 2A, 2B, and 5A-5D, located between the side rails. For simplicity, unless otherwise indicated, as the present description proceeds, one side rail will be described, and one support member will be described. It should be understood that, unless otherwise noted, the side rail description applies to both of the pair of side rails used in the cable tray system of the present disclosure, and the support member description applies to all of the at least one support members used in the cable tray system of the present disclosure.

Figure 1B:
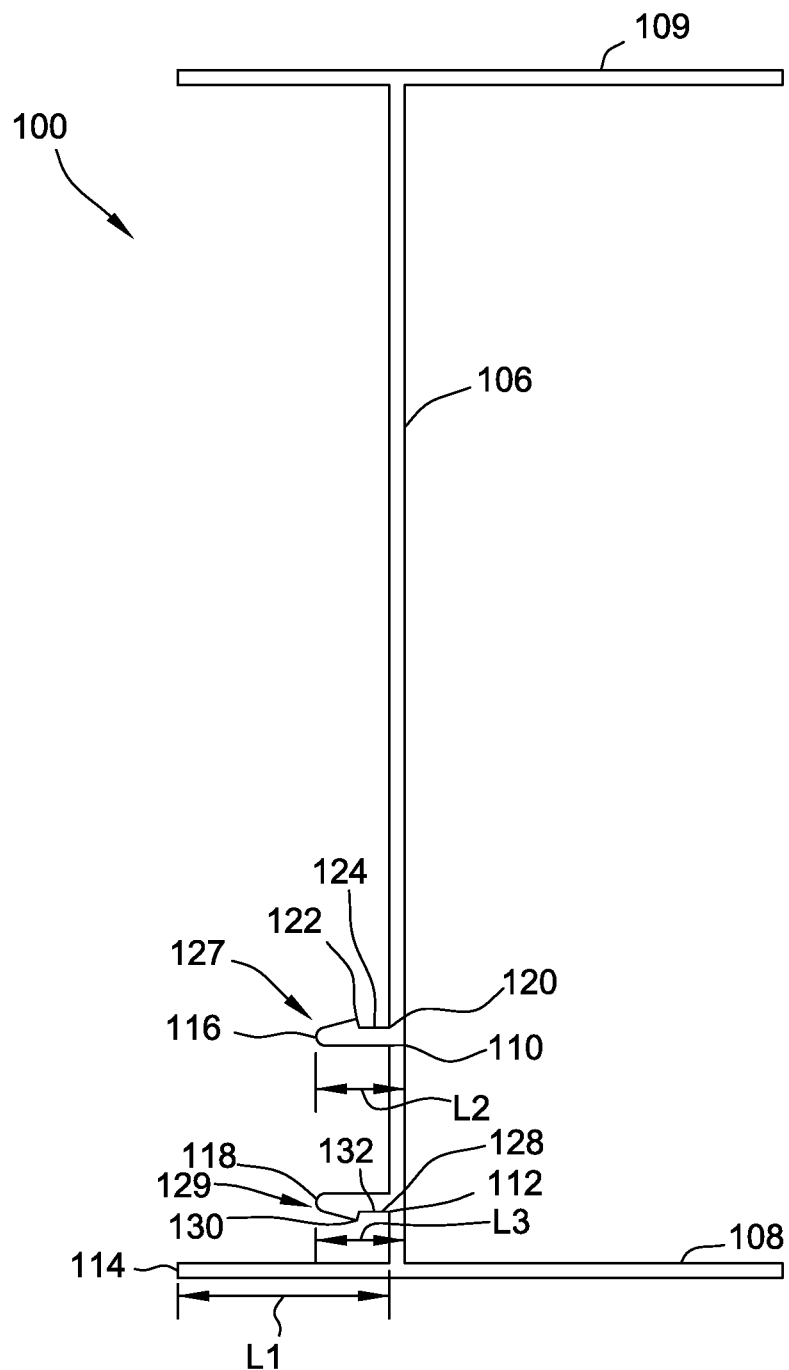
FIG. 1B depicts a side view of the portion of the first side rail of FIG. 1A.

FIG. 1A depicts a perspective view of a portion of a first side rail 100, also referred to as an "I-beam," or a "C-beam" in the art, in an exemplary embodiment of the present disclosure, and FIG. 1B depicts a side view of the first side rail 100. While only a portion of the side rail 100 is shown in FIG. 1A, the side rail 100 may be any length. For example, the side rail 100 may be 10 feet, 20 feet, or any suitable length to function as described herein. Typically, side rails 100 will comprise elongate members that are used to support a plurality of support members, for example, support member 200, shown in FIG. 2A of a cable tray system such as the exemplary section of cable tray system 300, shown in FIG. 3A, along considerable lengths in the associated installation location, such as an office or industrial facility. The side rails 100 may be fixed to the structural components of the installation location where the cable tray will be used to support the cables in a conventional manner, using known fasteners and methods. As the description proceeds, the side rail or the side rails shall comprise any side rail member independent of the length of the member.

As shown in FIG. 1B, the side rail 100 comprises a unitary member with a substantially I-shaped cross-section. The side rail 100 includes a support wall 106 that terminates at an upper support wall edge 102, an upper ledge member 109 or flange 109 at the upper support wall edge 102 that extends away from the support wall 106, and a lower ledge member 108 or flange 108 that extends away from support wall 106 at a lower support wall end 104. The support wall 106 may also be referred to as a web. The side rail 100 terminates at opposed longitudinally spaced first and second rail ends 111 and 113 respectively. The unitary side rail 100 also includes elongate first tab 110 and second tab 112 members that extend away from the support wall 106 between the ledges 108, 109. Like side rail 100, the ledges 108, 109 and the first and second tabs 110, 112 are elongate, extending longitudinally along the length of the side rail 100 and terminating at the opposed first and second rail ends 111, 113, as shown in FIG. 1A. The tabs are substantially parallel along their longitudinal length. As described herein, the ledges 108, 109 and the tabs 110, 112 are shown and described as terminating at the rail ends 111, 113, but it should be understood that the tabs 110, 112 may terminate near or substantially at the ends of the side rail 100 or at the side rail 100 ends, as shown. Also, the tabs 110, 112 are shown being located along support wall 106 proximate the ledge 108; however, it should be understood that the tabs may be located along wall 106 at any suitable location between the ledges 108, 109. Further, while the upper ledge 109 and the lower ledge 108 are shown and described with respect to FIGS. 1A and 1B, in other embodiments, the upper ledge 109 may not be included in the side rail 100, and the lower ledge 108 may only extend from the same side of the support wall 106 from which the tabs 110, 112 extend, as shown with respect to FIGS. 4A and 4B. Accordingly, it should be understood that the ledges 108, 109 may have different shapes and sizes in other embodiments of the side rail 100, and may not be included in the side rail 100 at all.

FIG. 1B illustrates the different lateral extents that the tabs 110, 112 and the ledge 108 extend from support wall 106. Specifically, the ledge 108 extends outward from the support wall 106 a first lateral dimension L1 and terminates at a ledge edge 114. The first tab 110 extends outward from the support wall 106 a second lateral dimension L2 and terminates at a first tab end 116. The second tab 112 extends outward from the support wall 106 a third lateral dimension L3 and terminates at a second tab end 118. Tabs 110 and 112 extend outwardly in the same lateral direction. In the exemplary embodiment, the respective lateral dimensions L2, L3 of the first and second tabs 110, 112 are substantially equal, and the lateral dimension L1 of the ledge 108 is greater than the tab lateral dimensions L2, L3. Accordingly, the ledge 108 may provide additional support as compared to a side rail where the ledge lateral dimension L1 is substantially equal in length to, or smaller than, the tab lateral dimensions L2, L3. In other embodiments, the lengths may comprise any suitable length required for the cable tray system to function as described herein, and more specifically the lengths of tabs identified as L2 and L3 may be different.

The first tab 110 includes a recessed portion 120 defined by the support wall 106, a contact face 122, and a lateral surface 124 that extends between the support wall 106 and the contact face 122. As shown in FIG. 1B, the first tab end 116 has a generally rounded configuration. An abutment surface 127 extends between the contact face 122 and the first tab end 116 and is angled inwardly as the surface 127 extends away from contact face 122 toward end 116. The first tab end 116, the abutment surface 127, and the recessed portion 124 all extend the entire longitudinal length of the first tab 110 along the rail member 100. The second tab 112 includes a structure that is substantially the same as the first tab 110. The second tab 112 includes a recessed portion 128 defined by the support wall 106, a contact face 130, and a lateral surface 132 that extends between the support wall 106 and the contact face 130. The second tab end 118 has a generally rounded configuration. An abutment surface 129 extends between the contact face 130 and the second tab end 118 and is angled inwardly as the surface 129 extends away from the contact face 130 and toward the second tab end 118. The second tab recessed portion 128 is directed towards the ledge 108, and the first tab recessed portion 120 is directed in an opposite direction to the ledge 108, toward the ledge 109. The tabs 110, 112 are similar in structure with the respective abutment surfaces 127, 129, contact faces 122, 128, and recessed portions 120, 130, and the tabs 110, 112 are oriented in respective opposite upwardly and downwardly oriented directions.

Figure 2A:
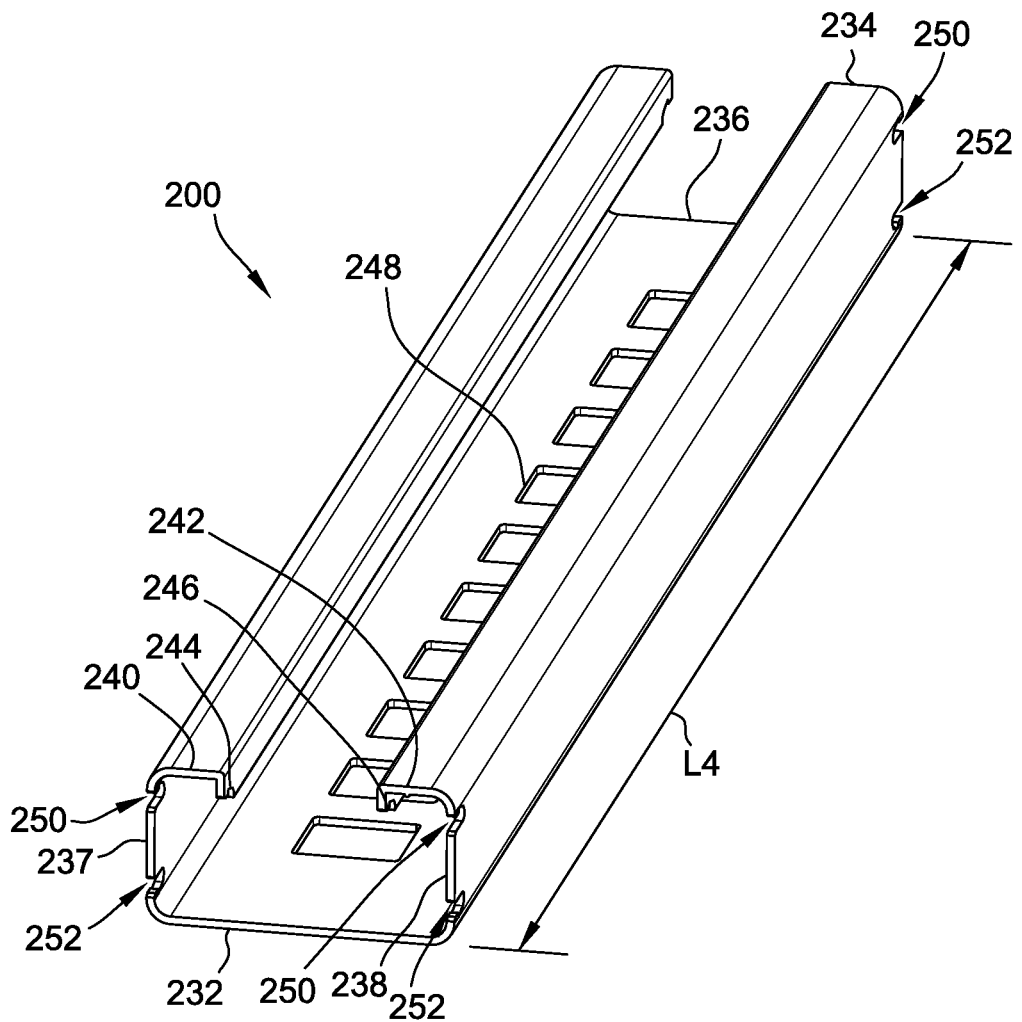
FIG. 2A depicts a perspective view of a first support member in an exemplary embodiment.
Figure 2B:
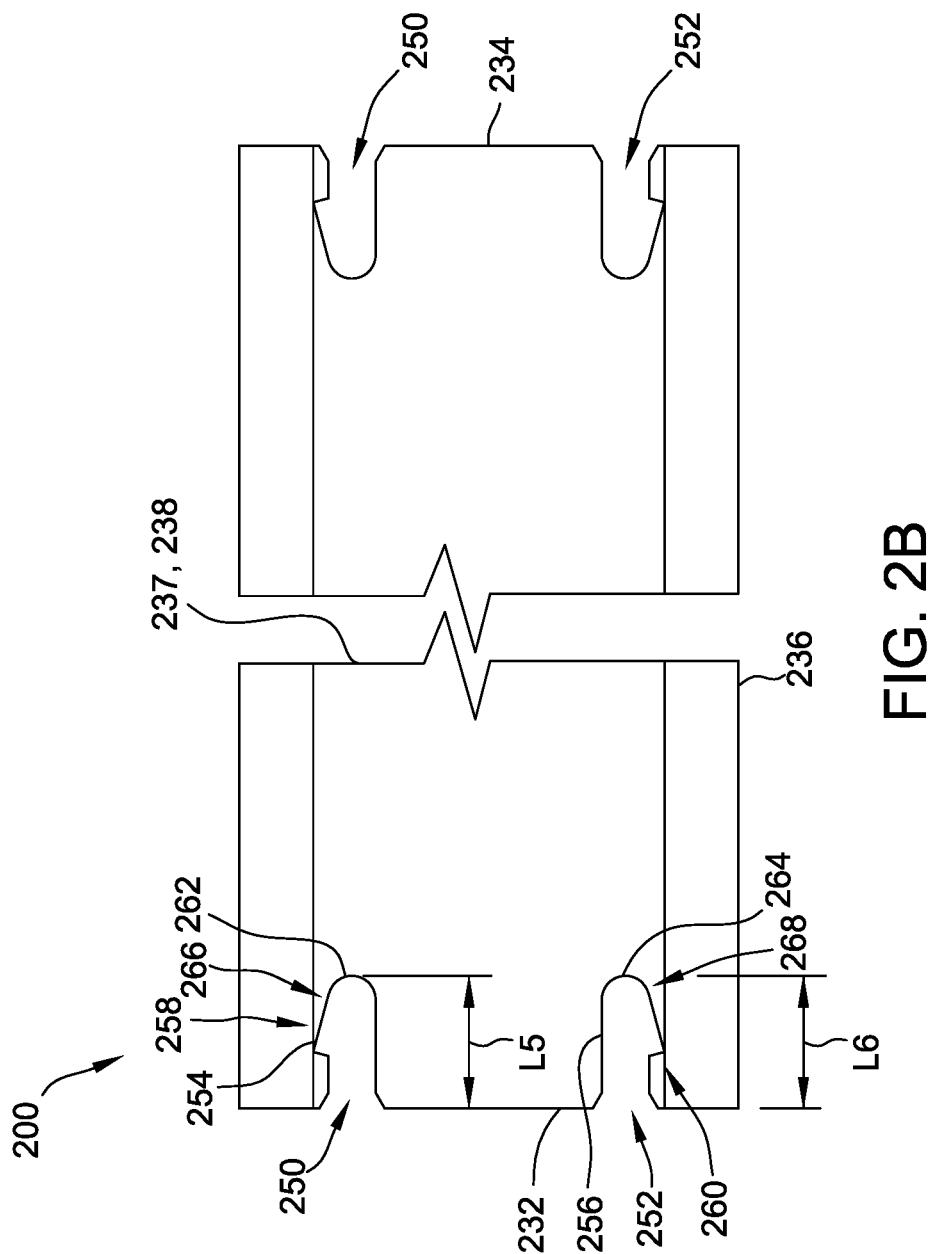
FIG. 2B depicts a side view of a portion of the first support member of FIG. 2A.

FIG. 2A depicts a perspective view of a portion of a first support member 200, also referred to as a "rung" or a "ladder step" in the art, in an exemplary embodiment. FIG. 2B depicts a side view of a portion of the support member 200. FIG. 2B highlights the structure at opposite ends 232, 234 of the support member 200 adapted to receive the tabs 110, 112 of each pair of opposed side rails 100 (shown in FIG. 1A). The tubular support member 200 has a length L4. The length L4 may be, for example, 36 inches, 42 inches, 48 inches, or any other suitable length for the support member 200 to function as described herein. A width of the support member 200 may be 6 inches, 8 inches, 10 inches, 12 inches, or any other suitable width for the support member 200 to function as described herein. The support member 200 terminates at first and second ends 232 and 234, respectively. The unitary, tubular support member 200 has a generally U-shaped cross-section defined by a lower portion 236. Parallel side walls 237, 238 extend from the lower portion 236 and terminate at opposed and aligned upper portions 240, 242, respectively. The upper portions 240, 242 extend from the respective sidewalls 237, 238, and are generally parallel to the lower portion 236. In the exemplary embodiment, the upper portions 240, 242 include flanges 244, 246, respectively, at the ends of the upper portions 240, 242. The flanges 244, 246 extend toward the lower portion 236. In other embodiments, the upper portions 240, 242 may not include flanges 244, 246, or the upper portions 240, 242 may be curved so that the upper portions 240, 242 do not include a discrete flange member.

A plurality of openings 248 are formed in the lower portion 236. The openings 248 serve as a means for providing cooling ambient air to the cables and other electronics that are supported by the cable tray system described herein. In the present exemplary disclosure, the support member 200 includes the plurality of openings 248 that have a square shape and are aligned along the length L4 of the support member 200 between ends 232 and 234. The openings 248 may be, for example, 4 inches on each side or 5 inches on each side. In other embodiments, the lower portion 236 may include any number of openings 248 having any arrangement and include any suitable shape, such as circular, oval or rectangular shapes. Alternatively, the lower portion may include no openings. In the present exemplary embodiment, the openings 248 are about 6 inches apart, from an end of one opening 248 to the first subsequent end of another opening 248. In other embodiments, the openings 248 may be spaced apart any suitable length including, for example, 9 inches or 12 inches.

Two recesses 250, 252 are provided in each of the side walls 237, 238 at the ends 232, 234. In the exemplary embodiment, the side wall 237 includes two recesses 250, 252 at the end 232, and two recesses 250, 252 at the end 234. The side wall 238 includes two recesses 250, 252 at the end 232, and two recesses 250, 252 at the end 234. The recesses 250 are adapted to receive the first tabs 110 (shown in FIG. 1A) and the recesses 252 are adapted to receive the second tabs 112 (shown in FIG. 1B) when the cable tray assembly is assembled. The recesses 250 are formed along the side walls 237, 238 proximate the upper portions 240, 242, and the recesses 252 are formed along the side walls 237, 238 proximate the lower portion 236.

The first and second recesses 250, 252 are similar in structure. The recesses 250, 252 each include a respective inwardly tapered opening 250, 252 formed in the ends 232, 234 of the side walls 237, 238, respectively. Each recess 250, 252 includes an associated shoulder 254, 256 that extends into the respective recess 250, 252 and terminates with a shoulder contact surface 258, 260. The recesses 250 terminate at rounded end 262, and the recesses 252 terminate at rounded end 264. The contact surfaces 258 and the end 262 are joined by a seating surface 266, and the contact surfaces 260 and the end 264 are joined by a seating surface 268. Each seating surface 266, 268 tapers inwardly as the surface 266, 268 extends between the respective contact surface 258, 260 and end 262, 264 of the recesses 250, 252. The length of each recess 250, 252 between the associated end 232 or 234 and end 262 or 264 is substantially the same. The length of recess 252 is identified as L5 in FIG. 2B, and the length of recess 252 is identified as L6 in FIG. 2B. In the exemplary embodiment, the values of the lengths L5 and L6 are substantially the same. In other embodiments, the lengths L5 and L6 may not be equal.

The recesses 250, 252 are sized and shaped complementary to the respective first and second tabs 110, 112 of the side rail 100 (all shown in FIG. 1A). As a result, the recesses 250, 252 allow the tabs 110, 112 to effectively pass through the recesses 250, 252 and thereby enable the support member 200 to be slidably located in the desired position relative to the side rails 100 supporting the support member 200 as well as other support members included in the associated cable support tray such as cable support apparatus 300, as shown in FIG. 3A.

Figure 3A:
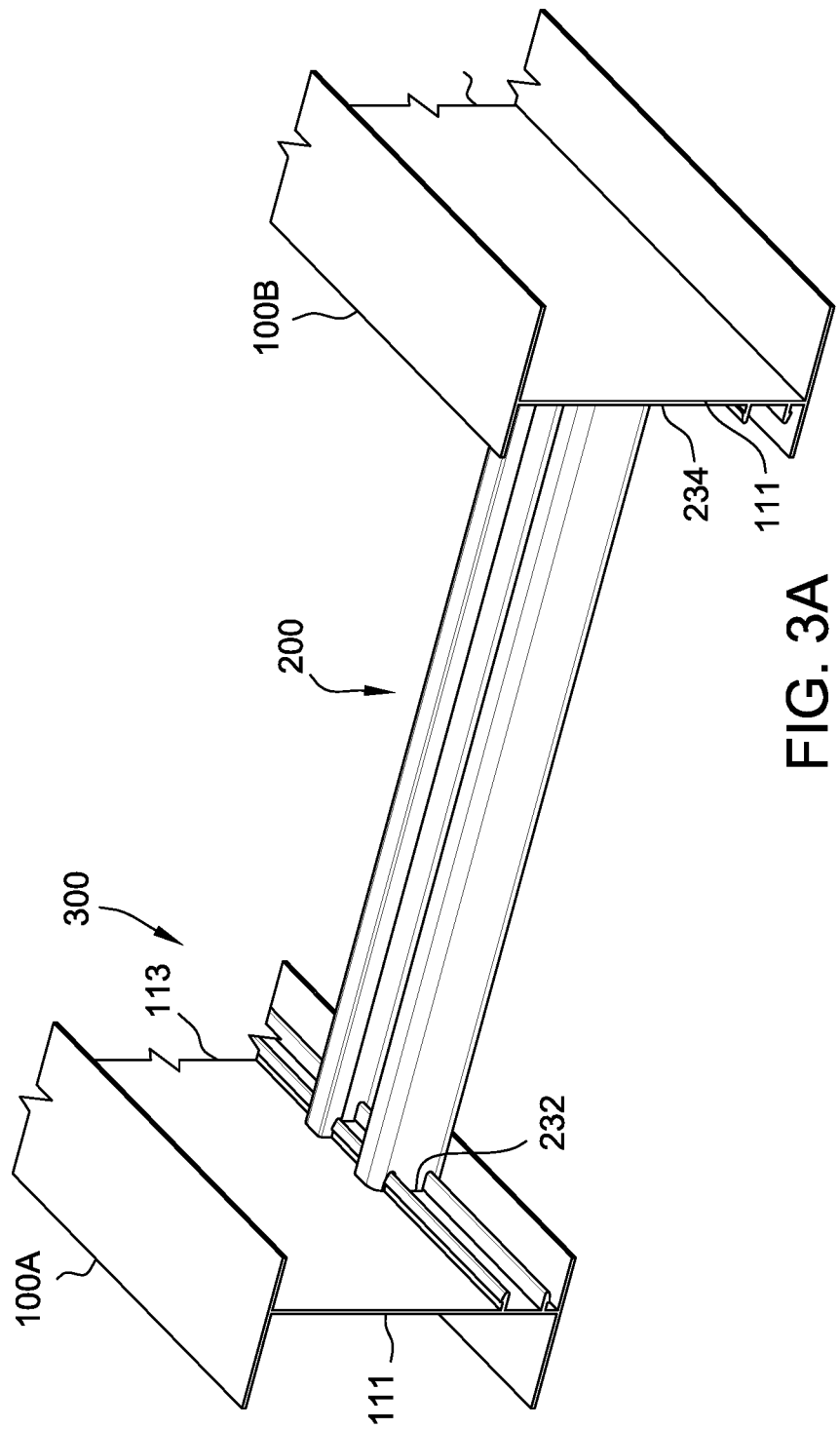
FIG. 3A depicts a perspective view of a portion of a first support assembly, wherein the first support member of FIG. 2A is coupled to the first side rail of FIG. 1A in an exemplary embodiment.
Figure 3B:
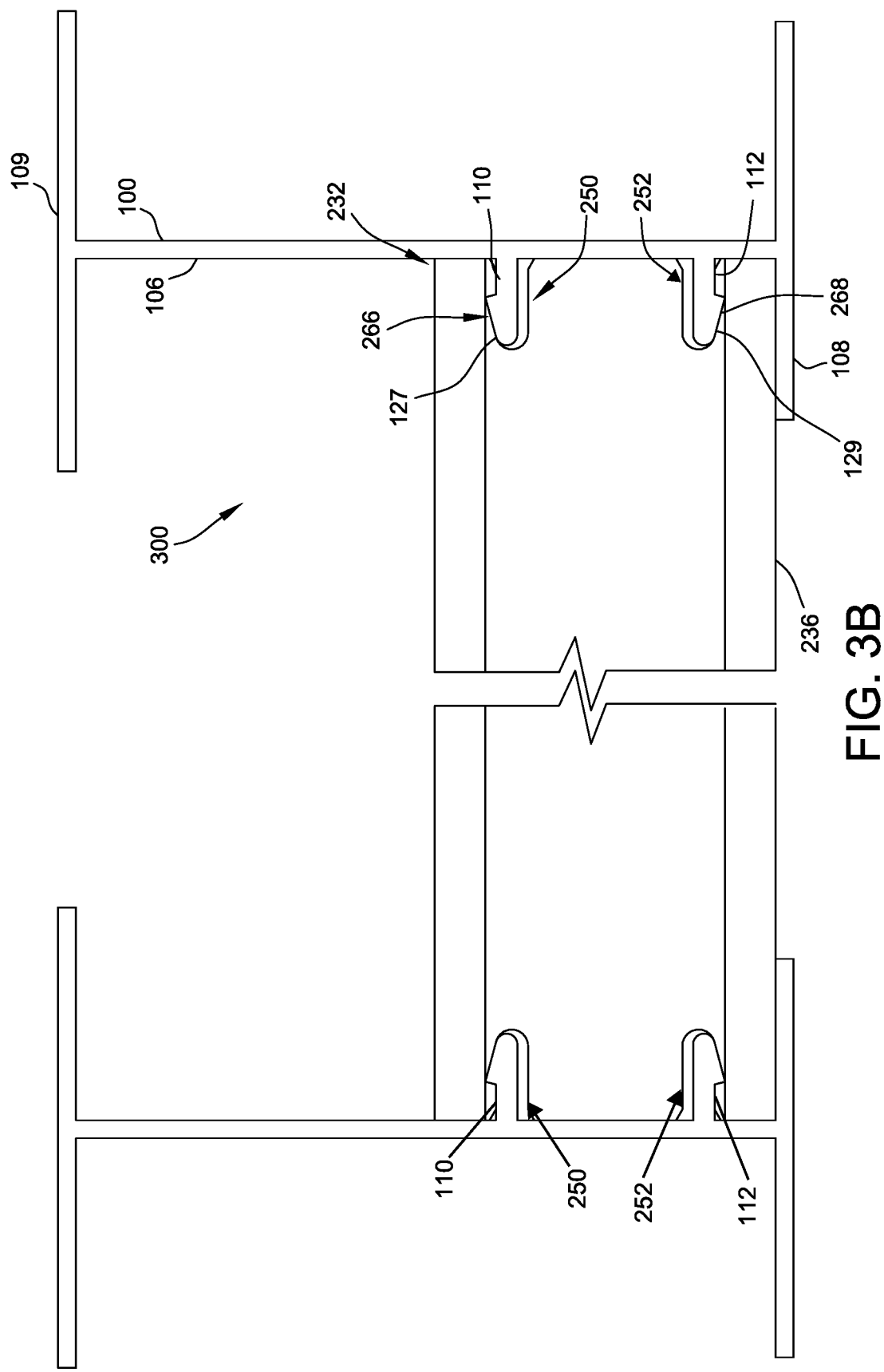
FIG. 3B depicts a side view of a portion of the first support assembly of FIG. 3A.

FIG. 3A depicts a perspective view of a cable tray apparatus 300, also referred to herein as a "cable tray support," wherein the support member 200 is shown located between like side rail members 100a and 100b, and FIG. 3B depicts a side view of a portion of the cable tray system 300. When the support member 200 is coupled to the side rails 100, the cable tray system 300 is in an engaged configuration. When the support member 200 is in a desired location within the cable support tray system 300, the end 232 of the support member 200 is located along the side rail 100a, by first passing the end 111 of the first tab 110 of the side rail 100a through the recess 250 of the support member side walls 237, 238, and passing the end 111 of the second tab 112 of the side rail 100a through the recess 252 of the support member side walls 237, 238. At the side rail 100b spaced from the side rail 100a, similarly, ends 111 of the tabs 110 and 112 of the side rail 100b are passed through the recesses 250, 252 located at the support member end 234.

In the engaged configuration, the first tabs 110 of the side rails 100 engage with the first recesses 250 of the support member 200, and the second tabs 112 of the side rails 100 engage with the second recesses 252 of the support member 200. When seated in the recesses, the abutment surfaces 127 of the first tabs 110 engage the seating surfaces 266 of the first recesses 250, shoulder 254 is located in recess 120 and contact surface 128 abuts contact surface 258. When tab 112 is seated in recesses 252, the abutment surfaces 129 of the second tabs 112 engage the seating surfaces 268, shoulder 256 is located in recess 130 and contact surface 130 abuts contact surface 260 and contact surface 128. Further, the ledge members 108 of the side rails 100 engage with the bottom portion 236 of the support member 200. The support member 200 may be snapped or slid into the engaged configuration. Because the tabs 110, 112 are sized and shaped to be complementary to the recesses 250, 252, respectively, the tabs 110, 112 securely fit into the recesses 250, 252, respectively. Additionally, the ledge member 108 is configured to securely engage with the bottom portion 236. Accordingly, the side rails 100 support the support member 200, and any cables supported by the support member 200, without requiring further securing means, like, for example, welding, nuts and bolts, rivets, etc.

Figure 4A:
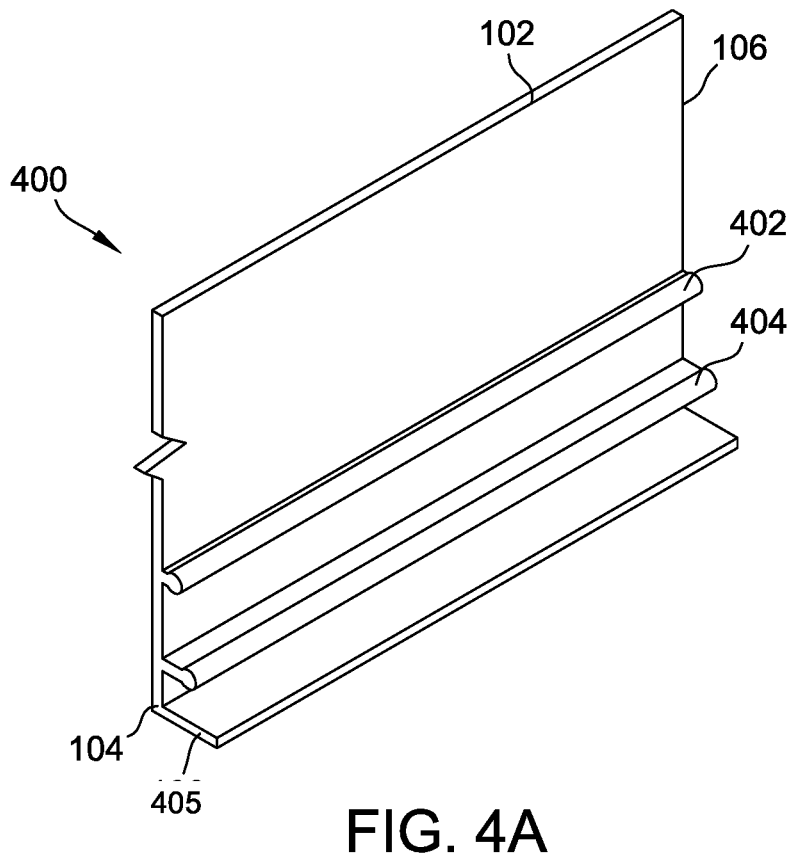
FIG. 4A depicts a perspective view of a second side rail in a second exemplary embodiment.
Figure 4B:
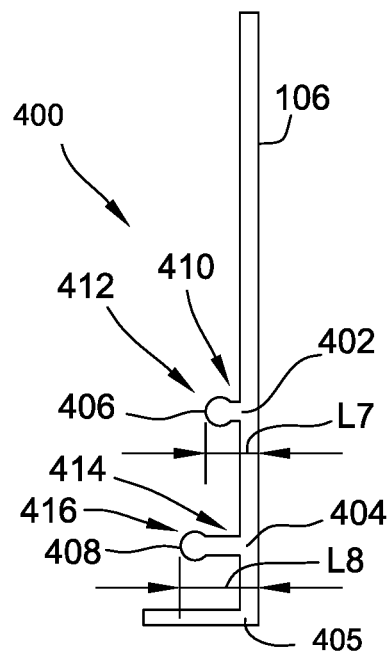
FIG. 4B depicts a side view of the second side rail of FIG. 4A.

FIG. 4A depicts a perspective view of a second side rail 400 in an exemplary embodiment, and FIG. 4B depicts a side view of the second side rail 400. The second side rail 400 is substantially similar to the first side rail 100, except the second side rail 400 includes a first tab 402 and a second tab 404 that are different in size and shape than the tabs 110, 112 of the first side rail 100 (shown in FIG. 1A). Further, a ledge member 405 of the side rail 400 extends laterally from the support wall 106 only on a same side as the tabs 402, 404, and the side rail 400 does not include an upper ledge, like the ledge 109 of the side rail 100 (shown in FIG. 1A). It should be noted that the side rail 400 can be used in a cable tray apparatus, like the cable tray apparatus 300 (shown in FIG. 3A), or a cable tray system, like the cable tray system 600 (shown in FIG. 6A) as long as one or more support members for example, the support members described in FIGS. 5A-5D, including complementary recesses to the tabs 402, 404 is also used.

The first tab 402 extends outwardly away from the support wall 106 a lateral dimension L7 and terminates at a first tab end 406. The second tab 404 extends outwardly away from the support wall 106 a lateral dimension L8 and terminates at a second tab end 408. The first tab 402 and the second tab 404 extend from the support wall 106 on the same side of the support wall 106. In the exemplary embodiment, the lateral dimension L7 of the first tab 402 is shorter in length than the lateral dimension L8 of the second tab 404. The tabs 402, 404 extend longitudinally along an entirety of a length of the side rail 400.

The first tab 402 includes a recessed portion 410 defined by the support wall 106 and a bulbous portion 412 proximate the end 406. The recessed portion 410 and the bulbous portion 412 extend the entire longitudinal length of the first tab 402 along the rail member 400. The second tab 404 includes a recessed portion 414 defined by the support wall 106 and a bulbous portion 416 proximate the end 408. The recessed portion 410 and the bulbous portion 416 extend the entire longitudinal length of the first tab 402 along the rail member 400. The tabs 402, 404 can be located at any location along the support wall 106 between the edge 102 and the ledge 405.

Figure 5A:
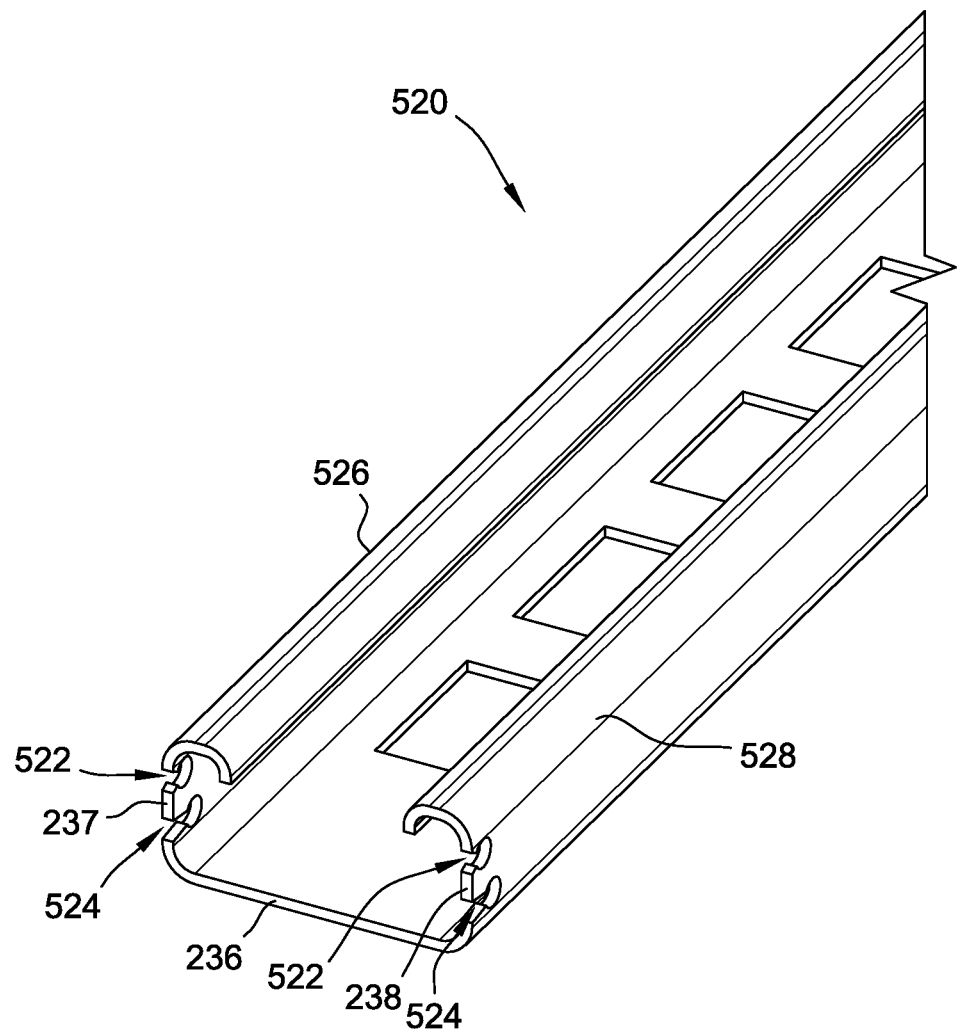
FIG. 5A depicts a perspective view of a portion of a second support member in a second exemplary embodiment.
Figure 5B:
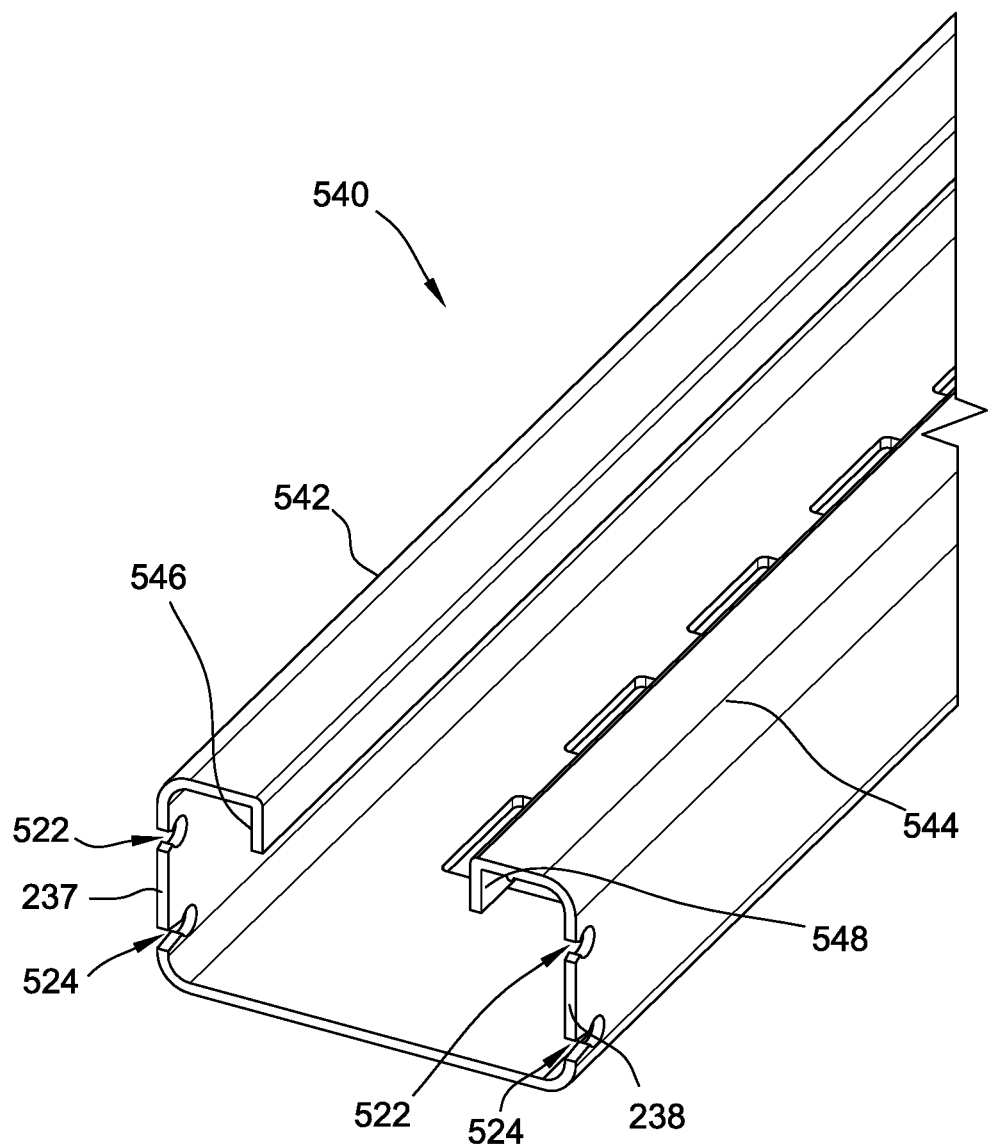
FIG. 5B depicts a perspective view of a portion of a third support member in a third exemplary embodiment.
Figure 5C:
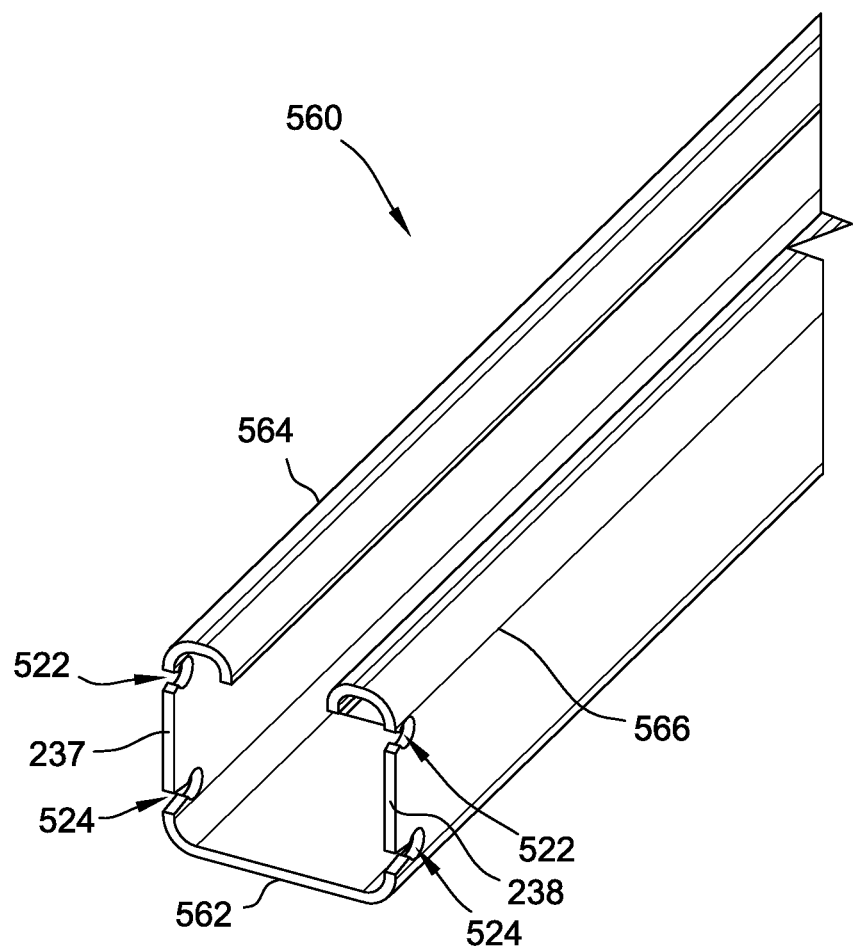
FIG. 5C depicts a perspective view of a portion of a fourth support member in a fourth exemplary embodiment.
Figure 5D:
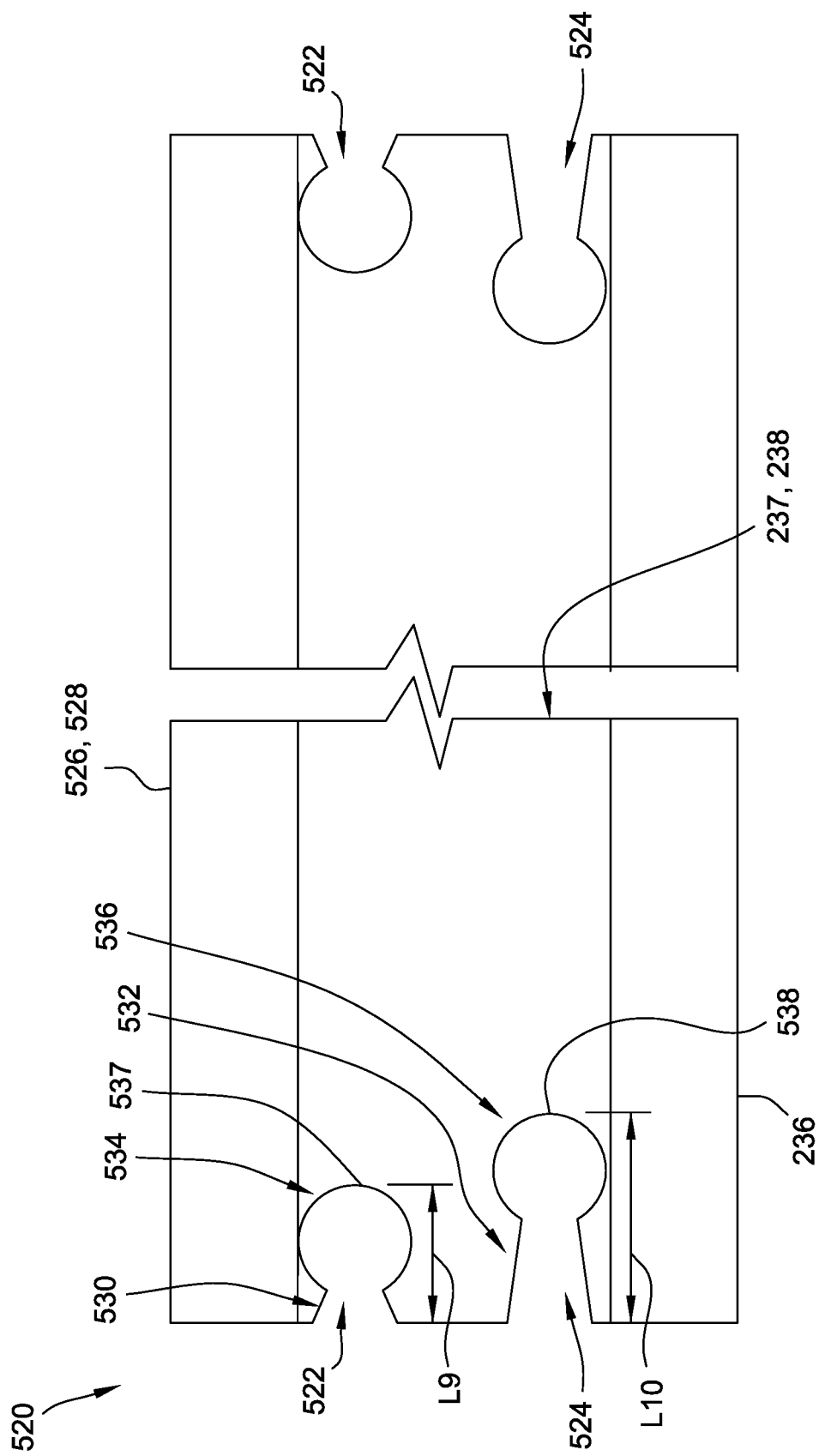
FIG. 5D depicts a side view of a portion of the second support member of FIG. 5A.

FIG. 5A depicts a perspective view of a portion of a second support member 520 in an example embodiment, FIG. 5B depicts a perspective view of a portion of a third support member 540 in an example embodiment, FIG. 5C depicts a perspective view of a portion of a fourth support member 560 in an example embodiment, and FIG. 5D depicts a side view of a portion of the second support member 520 in an example embodiment.

Each of the support members 520, 540, 560 is substantially similar to the first support member 200, except that each of the support members 520, 540, 560 include first and second recesses 522, 524 that differ in size and shape from the first and second recesses 250, 252 of the first support member 200. Further, the top portions of the support members 520, 540, 560 differ in size and shape from the top portions 240, 242 of the first support member 200, and a bottom portion 562 of the fourth support member 560 does not include openings 248, like the bottom portion 236 of the first support member 200 does. It should be noted that any of the support members 520, 540, 560 can be used in a cable tray apparatus, like the cable tray apparatus 300 (shown in FIG. 3B), or a cable tray system, like the cable tray system 600 shown in FIG. 6A, as long as side rails for example, the side rail 400 described with respect to FIGS. 4A and 4B, including complementary tabs to the recesses 522, 524 are also used.

The recesses 522, 524 are provided in each of the side walls 237, 238 at each end of the side walls 237, 238. The first recesses 522 are adapted to receive the first tabs 402 of the side rails 400 (shown in FIG. 4A), and the second recesses 524 are adapted to receive the second tabs 404 of the side rails 400 (shown in FIG. 4A) when the cable tray apparatus is assembled. The first recesses 522 are formed along the side walls 237, 238 proximate the top portions, and the second recesses 524 are formed along the side walls 237, 238 proximate the lower portion.

The recesses 522, 524 are similar in structure. The recesses 522, 524 each include a respective tapered portion 530, 532 and a respective bulbous portion 534, 536. The recesses 522 terminate at a rounded end 537, and the recesses 524 terminate at a rounded end 538. The tapered portions 530, 532 extend from the ends of the support walls 237, 238, and the bulbous portions 534, 536 extend from the respective tapered portions 530, 532 to the respective ends 537, 538. The length of the recesses 522 is identified as L9 in FIG. 5D, and the length of the recesses 524 is identified as L10 in FIG. 5D. In the exemplary embodiment, the length L9 of the recesses 522 is shorter than the length L10 of the recesses 524. In other embodiments, the lengths L9, L10 may be any suitable length, and in some embodiments, the lengths L9, L10 may be substantially the same.

The recesses 522, 524 are sized and shaped complementary to the respective first and second tabs 402, 404 of the side rail 400 (shown in FIG. 4A). As a result, the recesses 522, 524 allow the tabs 402, 404 to effectively pass through the recesses 522, 524 and thereby enable the support members 520, 540, 560 to be slidably located in the desired position relative to the side rail 400 supporting the support members 520, 540, 560, as well as other support members 520, 540, 560 included in the associated cable support tray, such as the cable support apparatus 300 (shown in FIG. 3A).

Further, it should be noted that while the recesses 522, 524 of the support members 520, 540, 560 are generally similar in shape, the support members 520, 540, 560 are slightly different shapes and sizes. Accordingly, the recesses 522, 524 may be located at slightly different locations along the side walls 237, 238 of the support members 520, 540, 560. For example, a length between the openings 522, 524 may differ between the support members 520, 540, 560. Further, it should be noted that although only one end of the support members 520, 540, 560 is shown in each of FIGS. 5A-5C, the recesses 522, 524 extend from both ends of the support members 520, 540, 560, like the recesses 250, 252 of the support member 200.

In the second support member 520, the top portions 526, 528 extending from the side walls 237, 238, respectively, have a curved shape. In the third support member 540, the top portions 542, 544 extending from the side walls 237, 238 have a flat shape and include side edges 546, 548, like the top portions 240, 242 of the first support member 200. Like the top portions 526, 528 of the second support member 520, the top portions 564, 566 of the fourth support member 560 have a curved shape. Support members 520, 540, 560 are assembled to side rails, like side rail 400, by passing the tab members 402, 404 through the associated recesses 522, 524 formed along the ends of the support members 520, 540, 560, in a similar manner described above relating to side rails 100 and support member 200. As a result, the support members 520, 540, 560 can be slid along the side rails 400 and located thereon at the required locations to support cable members located on the cable tray apparatus, like the cable tray apparatus 300 (shown in FIG. 3A), when the cable tray apparatus is in an engaged configuration. Accordingly, no fasteners are required when assembling the support members 520, 540, 560 to the side rails 400.

Figure 6A:
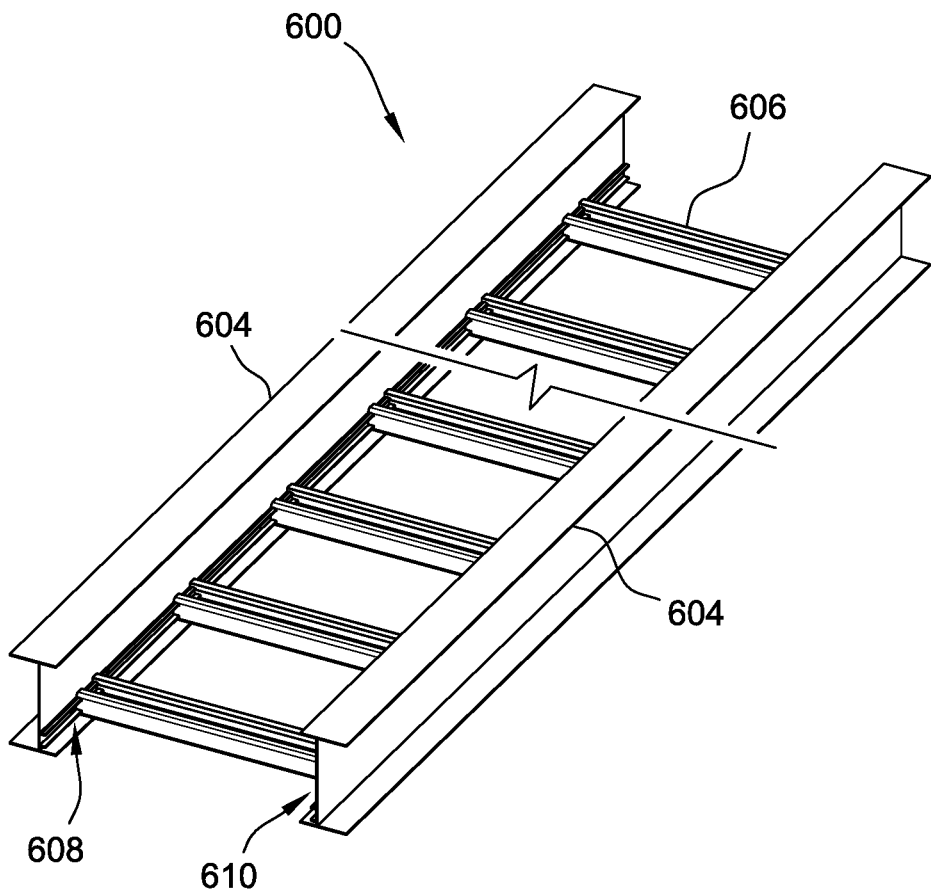
FIG. 6A depicts a perspective view of a support system in an exemplary embodiment.
Figure 6B:
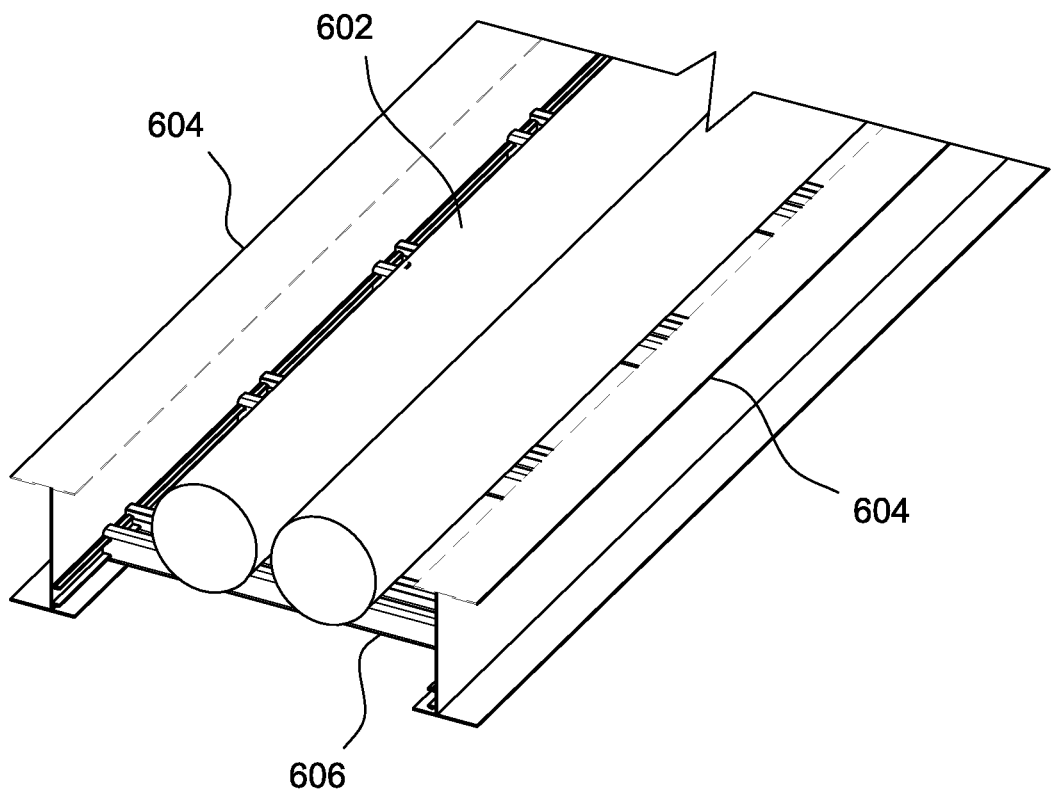
FIG. 6B depicts a perspective view of the support system of FIG. 6A.

FIG. 6A depicts a perspective view of a cable tray support system 600 in an example embodiment, and FIG. 6B depicts a perspective view of the cable tray support system 600 supporting exemplary cables 602. It should be noted that the cable tray support system 600 of FIGS. 6A and 6B is substantially similar to the apparatus 300, except that the system 600 includes multiple support members 606, whereas the apparatus 300 includes one support member 200. Accordingly, the apparatus 300 may be viewed as a part or a portion of the system 600. Further, in the illustrated embodiment, the system 600 includes at least six support members 606 supported by two side rails 604. In other embodiments, the system 600 may include any number of support members 606 supported by any number of side rail pairs 604. For example, a different system 600 may include three pairs of side rails 604 with each pair supporting at least six support members 606, and the adjoined side rails 604 may be connected together with a coupling means, like, for example, a splice plate.

The cable tray support system 600 includes two side rail members 604 and a plurality of support members 606 supported at their ends 608, 610 by the side rails 604. The side rails 604 may be the side rails 100 (shown in FIG. 1A) or the side rails 400 (shown in FIG. 4A), and the support members 606 may be any of the support members 200, 520, 540, 560 (shown in FIGS. 2A and 5A-C), as long as the support members 606 are configured to be engaged with and supported by the side rails 604. Like the side rails 100, 400, the side rails 604 include elongate tab members, and, like the support members 200, 520, 540, 560, the support members 606 include recesses at each end 608, 610, as previously described. The tabs of the side rails 604 are passed through the recesses of the support members 606, and the support members 606 are slid along the tabs to desired locations along the length of the side rails 604 to assemble the support system 600.

That is, the support system 600 is configured in substantially the same way as the support apparatus 300, except that the support system 600 is illustrated with a plurality of support members 606. As described above, it should be noted that any of the side rails and support members described herein can be used in the support system 600, as long as the tabs of the side rails 604 are complementary to the openings of the support members 606, such that the side rail 604 engages with and supports the support members 606.

The support system 600 may be placed in any suitable location where there is a need for cables 602 to be supported. For example, the side rails 604 may include attachment means (not shown) to attach the support system 600 to a wall or inside of a ceiling. Further, the support system 600 may be configured to be stacked in a basement or underground. In the support system 600, the cables 602 are placed on top of the support members 606 to be supported by the support system 600. The cables 602 are placed parallel to the side rails 604 and perpendicular to the support members 606 to provide the most support.

As illustrated in FIG. 6A, the support system 600 includes six support members 606 spaced evenly along the length of the side rails 604. In other embodiments, the support system 600 may include as many support members 606 located along the side rails 604 as needed to support the cables 602. For example, the support members 606 may be spaced along the side rails 604 such that the support members 606 are touching each other to support cables 602 that are heavy or require a lot of support. Alternatively, the support members 606 may be spaced further apart along the side rails 604 to support cables 602 that are lighter or do not require as much support.

An example technical effect of the apparatus and system described herein includes one or more of: (a) providing a cable tray support system that is dynamically configurable between a variety of different configurations; and (b) providing a cable tray support system that does not require additional attachment means (e.g., adhesive, welding, nuts and bolts, etc.) to attach a support member to a side rail to support cables placed within the support members.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A cable tray apparatus comprising:
a first side rail,
a second side rail spaced from the first side rail, each side rail including a support wall and first and second tabs separately extending from the support wall; and
at least one support member having a first end and a second end, the support member including (i) side walls extending between the first and second ends and (ii) first and second recesses formed within each of the two side walls at each of the first and second ends, wherein the support member is located between the first side rail and the second side rail, wherein the first and second tabs of the first side rail are configured to engage and be located within the respective first and second recesses at the first end of the support member, wherein the first and second tabs of the second side rail are configured to engage and be located within the respective first and second recesses at the second end of the support member, and wherein the support member is slidable relative to the first and second side rails along the first and second tabs.

2. The cable tray apparatus of claim 1, wherein the first and second recesses are configured to be sized and shaped complementary to the respective first and second tabs.

3. The cable tray apparatus of claim 1, wherein the first recesses have a first length, and wherein the second recesses have a second length.

4. The cable tray apparatus of claim 3, wherein the first recesses taper inwardly from the first and second ends of the side walls to a first edge within the side walls, and wherein a length from the respective first and second ends to the first edge is the first length.

5. The cable tray apparatus of claim 4, wherein the second recesses taper inwardly from the first and second ends of the side walls to a second edge within the side walls, and wherein a length from the respective first and second ends to the second edge is the second length.

6. The cable tray apparatus of claim 5, wherein the first and second tabs include a bulbous shape, and wherein a length of the second tab is shorter than a length of the first tab.

7. The cable tray apparatus of claim 6, wherein the first and second recesses include a bulbous shape complementary to the respective first and second tabs, wherein the first length is equal to the length of the first tab, and wherein the second length is equal to the length of the second tab.

8. The cable tray apparatus of claim 1, wherein each of the first and second tabs comprise a contact face that is angled.

9. The cable tray apparatus of claim 8, wherein each of the first and second tabs further comprise a lateral surface that connects the contact face and the support wall, wherein the lateral surface is perpendicular to the support wall, and wherein an abutment surface is formed between the contact face and a first tab end.

10. The cable tray apparatus of claim 9, wherein the first recess includes a seating surface complementary to the abutment surface of the first tab, and wherein the second recess includes a seating surface complementary to the abutment surface of the second tab.

11. The cable tray apparatus of claim 1, wherein the support member further includes a bottom portion and two top portions opposite the bottom portion, and wherein the two top portions extend from the two side walls.

12. The cable tray apparatus of claim 11, wherein the two top portions include one of a straight shape and a curved shape.

13. The cable tray apparatus of claim 11, wherein the bottom portion of the support member includes a plurality of openings formed within the bottom portion.

14. The cable tray apparatus of claim 13, wherein the plurality of openings have a shape from the group consisting of oval, square, and rectangle.

15. A cable tray system comprising:
a first side rail;
a second side rail spaced from the first side rail, each side rail including a support wall and first and second tabs separately extending from the support wall; and
a plurality of support members, each of the plurality of support members including (i) a first end, (ii) a second end, (iii) side walls extending between the first and second ends, and (iv) first and second recesses formed within each of the two side walls at each of the first and second ends, wherein the plurality of support members are located at different positions between the first side rail and the second side rail, wherein the first and second tabs of the first side rail are configured to engage and be located within the respective first and second recesses at the first end of the support members, wherein the first and second tabs of the second side rail are configured to engage and be located within the respective first and second recesses at the second end of the support members, and wherein the plurality of support members are slidable relative to the first and second side rails along the first and second tabs.

16. The cable tray system of claim 15, wherein the first and second recesses are configured to be sized and shaped complementary to the respective first and second tabs.

17. The cable tray system of claim 15, wherein each of the first and second tabs comprise a contact face that is angled.

18. The cable tray system of claim 17, wherein each of the first and second tabs further comprise a lateral surface that connects the contact face and the support wall, wherein the lateral surface is perpendicular to the support wall, and wherein an abutment surface is formed between the contact face and a first tab end.

19. The cable tray system of claim 18, wherein the first recesses include a seating surface complementary to the abutment surface of the first tab, and wherein the second recesses include a seating surface complementary to the abutment surface of the second tab.

\* \* \* \* \*